United States Patent [19]

Kitada

[11] Patent Number: 4,501,796

[45] Date of Patent: Feb. 26, 1985

[54] RADIOGRAPHIC INTENSIFYING SCREEN

[75] Inventor: Akira Kitada, Kaisei, Japan

[73] Assignee: Fuji Photo Film Co., Ltd., Kanagawa, Japan

[21] Appl. No.: 511,149

[22] Filed: Jul. 6, 1983

[30] Foreign Application Priority Data

Jul. 8, 1982 [JP] Japan ................................ 57-117779

[51] Int. Cl.³ ................................................ B32B 5/16

[52] U.S. Cl. .................................... 428/337; 428/340; 428/480; 428/690; 428/691

[58] Field of Search ............... 428/690, 691, 480, 340, 428/323, 337

[56] References Cited

U.S. PATENT DOCUMENTS 4,415,471 11/1983 Degenhardt .................... 428/691 X

*Primary Examiner*—Thomas J. Herbert

*Attorney, Agent, or Firm*—Gerald J. Ferguson, Jr.; Joseph J. Baker

[57] ABSTRACT

A radiographic intensifying screen comprising a support and at least one phosphor layer provided thereonto which comprises a binder and a phosphor dispersed therein, wherein the support is a resin film containing a white pigment.

6 Claims, 1 Drawing Figure

RADIOGRAPHIC INTENSIFYING SCREEN

BACKGROUND OF THE INVENTION

1. Field of the Invention

This invention relates to a radiographic intensifying screen, and more particularly, to a radiographic intensifying screen comprising a support and at least one phosphor layer provided thereonto which comprises a binder and a phosphor dispersed therein.

2. Description of the Prior Art

In radiography used in a variety of fields such as diagnosis and nondestructive inspection, a radiographic intensifying screen is generally employed in close contact with one or both surfaces of a radiographic film for enhancing the speed of a radiographic system. The radiographic intensifying screen comprises a support and a phosphor layer provided thereon. A transparent film is generally provided on the free surface of the phosphor layer to keep the phosphor layer from chemical and physical deterioration.

The phosphor layer comprises a binder and a phosphor dispersed therein. When excited with a radiation such as X-rays supplied through an object, the phosphor emits light of high luminance in proportion to the dose of the radiation. The radiographic film positioned in close contact with the surface of the intensifying screen is exposed to the light emitted by the phosphor, in addition to direct exposure to the radiation supplied through the object. As a result, the radiographic film can be sufficiently sensitized to form a radiation image of the object, even if the radiation is applied to the object at a relatively small dose.

It is required for the radiographic intensifying screen with the aforementioned basic structure to have a high radiographic speed, and to provide an image of high quality (sharpness and graininess). In order to improve the radiographic speed of the intensifying screen and the quality of the image provided thereby, various proposals have been previously made.

For enhancement of the radiographic speed of an intensifying screen, it has been known to provide a light-reflecting layer between the support and the a phosphor layer. For instance, the light-reflecting layer is provided by a method involving vapor deposition of a metal such as aluminum, lamination of a metal foil such as an aluminum foil, or coating of a binder solution containing white powder such as titanium dioxide.

The radiographic intensifying screen also ought to have a sufficient mechanical strength to keep itself from separation of the phosphor layer from the support when mechanical shocks such as bending are given to the intensifying screen in the use. Since the intensifying screen is not substantially deteriorated by exposure to a radiation, the intensifying screen can be repeatedly used for a long period. Threrefore, the intensifying screen is required to be resistant to mechanical shocks given (for example, in the operation of changing a radiographic film) and to be free from separation of the phosphor layer from the support.

However, the provision of a light-reflecting layer for enhancement of the radiographic speed likely brings some disadvantageous features into the radiographic intensifying screen. For instance, a light-reflecting layer formed on a support by the above-mentioned coating procedure possibly has not a suitable surface which is appropriate for providing a phosphor layer thereonto, and the bonding between the coated phosphor layer and the light-reflecting layer is sometimes poor. Accordingly, when a light-reflecting layer is provided on a support, it is necessary to further provide an adhesive layer on the surface of the light-reflecting layer. In such a case, the resultant radiographic intensifying screen shows decrease in the flexibility, as well as in the mechanical strength. Further, where the light-reflecting layer is formed by applying a coating solution containing a binder and a white powder such as titanium dioxide onto the support, the light-reflecting layer has to be formed in a relatively large thickness to achieve the desired high light-reflectivity, and as a result, the flexibility of the resurtant intensifying screen is decreased.

SUMMARY OF THE INVENTION

A primary object of the present invention is to provide a radiographic intensifying screen improved in the radiographic speed.

Another object of the invention is to provide a radiographic intensifying screen improved in the flexibility and the mechanical strength, as well as in the radiographic speed.

There is provided by the present invention a radiographic intensifying screen comprising a support and at least one phosphor layer provided thereonto which comprises a binder and a phosphor dispersed therein, wherein the support is a resin film containing a white pigment.

According to the present invention, a radiographic intensifying screen prominently improved in the radiographic speed without decrease in the flexibility and the mechanical strength can be obtained by employing a resin film containing a white pigment as a support thereof.

When a radiation such as X-rays transmitted by an object impinges upon the phosphor layer of a radiographic intensifying screen, the phosphor particles contained in the phosphor layer absorb the radiation energy and emit light having a wavelength within the visible region to the near ultraviolet region which is different from the wavelength of the introduced radiation. The so emitted light advances in all directions, and a part of the light enters directly into a photosensitive layer of the radiographic film placed in contact with the screen so as to contribute the formation of an image on the radiographic film. Another part of the light advances toward the interface between the phosphor layer and the support in the opposite direction of the radiographic film, and the light other than absorbed or transmitted by the support is reflected by the support surface to enter the radiographic film, also contributing the formation of the image. In the case of a radiographic intensifying screen not having a light-reflecting layer between the support and the phosphor layer, most of the light advancing toward the interface therebetween is absorbed by the support to vanish, or transmitted by the support to be scattered away, resulting in extreme decrease of the radiographic speed of the intensifying screen.

As a result of the study of the present inventors, it was discovered that the decrease of the radiographic speed of the radiographic intensifying screen caused by vanishment of the light (which is emitted by the phosphor particles and advancing toward the interface between the support and the phosphor layer) before contributing the formation of an image on a radiographic film, that is, caused by absorption and/or transmission by the support, can be effectively prevented by using a resin film containing a powdery white pigment as the support.

Further, it was discovered that the radiographic intensifying screen having the above-mentioned support shows high flexibility and sufficient mechanical strength, so as to be highly resistant to mechanical shocks given (for example, in the operation of changing a radiographic film) and to be employable for repeated uses for a long period.

DESCRIPTION OF THE PREFERRED EMBODIMENT

Figure 1:
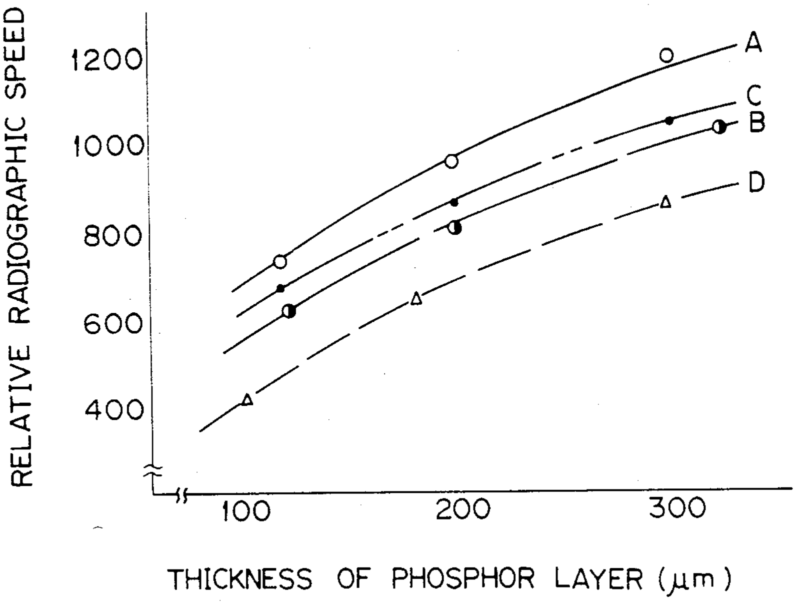
FIG. 1 shows relationships between a thickness of the phosphor layer and a relative radiographic speed in the various radiographic intensifying screens employing different supports materials.

The radiographic intensifying screen of the present invention can be prepared, for instance, in the manner as described below.

Examples of the resin employable in the support of the radiographic intensifying screen in the invention include transparent resins such as cellulose acetate, polyester, polyethylene terephthalate, polyamide, polyimide, triacetate and polycarbonate. From the viewpoint of the constitution of the support defined in the present invention, as well as from the viewpoint of characteristics of a radiographic intensifying screen prepared therefrom, particularly preferred resin is polyethylene terephthalate.

The support in the intensifying screen of the invention can be prepared by incorporating a powdery white pigment into the resin and subsequently forming a film containing the white pigment.

Examples of the white pigment preferably employable in the invention include MgO, $Al_2O_3$, $SiO_2$, ZnO, $TiO_2$, $Nb_2O_5$, BaFBr, $BaSO_4$, lithopone ($BaSO_4$+ZnS), and $2PbCO_3Pb(OH)_2$. These white pigments have particularly high covering power and show high refractive index, so that they can satisfactorily scatter the light under reflection or refraction, and accordingly the radiographic speed of the resultant radiographic intensifying screen is improved. The resin film containing the powdery white pigment serving as support generally has higher covering power than the light-reflecting layer comprising a binder and the white pigment dispersed therein. For the reason, the former shows higher reflectivity for light in the visible region than the latter.

Among the above-described white pigments, the most preferred white pigment is $TiO_2$. $TiO_2$ is classified into two types according to the crystal structure, that is, rutile-type and anatase-type. The reflection spectrum of rutile-type $TiO_2$ starts from approximately 400 nm on the shorter wavelength side, and the rutile-type $TiO_2$ only reflects the visible light with a wavelength longer than approximately 400 nm. On the other hand, the reflection spectrum of anatase-type $TiO_2$ starts from approximately 360 nm on the shorter wavelength side, and the anatase-type $TiO_2$ not only reflects the visible light but also reflects the near ultraviolet rays.

Accordingly, when a phosphor such as $Gd_2O_2S$:Tb that emits lights only in visible region is used in a phosphor layer, the improvement of radiographic speed of the intensifying screen by the incorporation of a powdery $TiO_2$ is at approximately the same level for $TiO_2$ of both types. However, when using in a phosphor layer a phosphor such as a divalent europium activated alkaline earth metal fluorohalide phosphor, e.g. BaFCl:$Eu^{2+}$ or BaFBr:$Eu^{2+}$, which emits light in near ultraviolet region as well as in visible region (these divalent europium activated alkaline earth metal fluorohalide phosphors emit light at higher level in the near ultraviolet region than in the visible region), employment of the anatase-type $TiO_2$ can remarkabley improve the radiographic speed of the resultant intensifying screen, as compared with the case employing the rutile-type $TiO_2$. Accordingly, the anatase-type $TiO_2$ is particularly suitable for the incorporation in the support of the intensifying screen comprising a phosphor which emits light both in the near ultraviolet region and in the visible region.

The thickness of the support prepared in the manner as mentioned above preferably ranges from 100 to 500 $\mu$m.

The above-mentioned white pigment is preferably contained in the support in an amount ranging from 0.1 to 10.0 mg./cm$^2$ based on the surface area of the support, and an amount from 0.5 to 5.0 mg./cm$^2$ is more preferred.

In the radiographic intensifying screen of the present invention, a part of the light which is emitted by phosphor particles contained in the phosphr layer advances toward the interface between the support and the phosphor layer and is reflected or scattered under refraction by the white pigment particles contained in the support. As a result, most of the light is turned back to be transmitted by the phosphor layer and then enters into the photosensitive layer of a radiographic film. Accordingly, the speed of the radiographic system is prominently enhanced.

Further, the process for the preparation of the radiographic intensifying screen of the invention employing the above-mentioned support can be free from the procedure for forming a light-reflecting layer such as a coating procedure, which is generally required in the preparation of the conventional high speed intensifying screen. Furthermore, the present invention can solve problems such as the decrease of flexibility and mechanical strength of the intensifying screen in the conventional high speed intensifying screen occurring due to the provision of a light-reflecting layer. Moreover, in accordance with the invention, it is possible to easily controll the flexibility of the resultant intensifying screen by using a suitable binder in the coating dispersion for formation of the phosphor layer.

An adhesive layer may be provided on the support by coating an adhesive agent over the surface of the support on the phosphor layer side, to enhance the bonding between the support and the phosphor layer. Further, there may be provided a great number of pits on the phosphor layer side surface of the support to enhance the sharpness of a resulting image, as described in Japanese Patent Application No. 57(1982)-64674 filed by the present applicant.

On the surface of the support containing the white pigment is then provided a phosphor layer. The phosphor layer substantially comprises a binder and phosphor particles dispersed therein.

A variety of phosphors employable for a radiographic intensifying screen have been known and any one of them can be used in the present invention. Examples of the phosphor preferably employable in the invention include:

tungstate phosphors such as $CaWO_4$, $MgWO_4$, and $CaWO_4$:Pb;

terbium activated rare earth oxysulfide phosphors such as $Y_2O_2S$:Tb, $Gd_2O_2S$:Tb, $La_2O_2S$:Tb, $(Y,Gd)_2O_2S$:Tb and $(Y,Gd)_2O_2S$:Tb,Tm;

terbium activated rare earth phosphate phosphors such as $YPO_4$:Tb, $GdPO_4$:Tb and $LaPO_4$:Tb;

terbium activated rare earth oxyhalide phosphors such as LaOBr:Tb, LaOBr:Tb,Tm, LaOCl:Tb, LaOCl:Tb,Tm, GdOBr:Tb and GdOCl:Tb;

thulium activated rare earth oxyhalide phosphors such as LaOBr:Tm and LaOCl:Tm;

barium sulfate phosphors such as $BaSO_4$:Pb, $BaSO_4$:$Eu^{2+}$ and $(Ba,Sr)SO_4$:$Eu^{2+}$;

divalent europium activated alkaline earth metal fluorohalide phosphors such as BaFCl:$Eu^{2+}$, BaFBr:$Eu^{2+}$, BaFCl:$Eu^{2+}$,Tb, BaFBr:$Eu^{2+}$,Tb, $BaF_2.BaCl_2.KCl$:$Eu^{2+}$, $BaF_2.BaCl_2.xBaSO_4.KCl$:$Eu^{2+}$ and $(Ba,Mg)F_2.BaCl_2.KCl$:$Eu^{2+}$;

iodide phosphors such as CsI:Na, CsI:Tl, NaI:Tl and KI:Tl;

sulfide phosphors such as ZnS:Ag, (Zn,Cd)S:Ag, (Zn,Cd)S:Cu and (Zn,Cd)S:Cu,Al; and hafnium phosphate phosphors such as $HfP_2O_7$:Cu.

The above-described phosphors are given by no means to restrict the phosphor employable in the present invention. Any other phosphors can also be employed, provided that the phosphor emits light in the visible and/or near ultraviolet region when exposed to a radiation such as X-rays. As described hereinbefore, in the case of using a phosphor such as the above-mentioned divalent europium activated alkaline earth metal fluorohalide phosphor capable of emitting light in the both near ultraviolet and visible regions, the anatase-type $TiO_2$ is preferably employed as the white pigment to be contained in the support.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl acetate copolymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the support, for instance, by the following procedure.

In the first place, phosphor particles and a binder are added to an appropriate solvent, and then, they are mixed to prepare a coating dispersion of the phosphor particles dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethylene glycol monoethylether and ethylene glycol monoethylether; and mixtures of the above-mentioned compounds.

The ratio between the binder and the phosphor particles in the coating dispersion may be determined according to the characteristics of the aimed radiographic intensifying screen and nature of the phosphor employed. Generally, the ratio therebetween is in the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of the support to form a layer of the coating dispersion. The coating procedure can be carried out by a conventional method such as a method using a doctor blade, a roll coater or a knife coater.

After applying the coating dispersion to the support, the coating dispersion is then heated slowly to dryness, so as to complete the formation of a phosphor layer. The thickness of the phosphor layer varies depending upon the characteristics of the aimed radiographic intensifying screen, nature of the phosphor, the ratio between the binder and the phosphor particles, etc. Generally, the thickness of the phosphor layer is in the range of from 20 $\mu$m to 1 mm, preferably from 50 to 500 $\mu$m.

The phosphor layer can be provided onto the support by the methods other than that given in the above. For instance, the phosphor layer is initially prepared on a sheet material such as a glass plate, metal plate or plastic sheet using the aforementioned coating dispersion and then the so prepared phosphor layer is overlaid on the support by pressing or by using an adhesive agent.

The conventional radiographic intensifying screens generally have a transparent film on the free surface of the phosphor layer to protect the phosphor layer from physical and chemical deterioration. In the intensifying screen of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate or vinyl chloride-vinyl acetate copolymer), and drying the coated solution. Alternatively, the transparent film can be provided onto the phosphor layer by beforehand preparing from a polymer such as polyethylene terephthalate, polyethylene, polyvinylidene chloride or polyamide, following by placing and fixing onto the phosphor layer with an appropriate adhesive agent to provide the protective film. The transparent protective film preferably has a thickness in the range of approximately 3 to 20 $\mu$m.

The present invention will be further described referred to the following examples, which are by no means intended to restrict the invention.

EXAMPLE 1

As a support, a polyethylene terephthalate film (thickness: 188 μm) containing powdery titanium dioxide (rutile-type) in an amount of 2.2 mg./cm$^2$ based on the surface area of the support was prepared.

A dispersion containing a terbium activated gadolinium oxysulfide ($Gd_2O_2S$:Tb) phosphor particles, a linear polyester resin and a nitrocellulose (nitrification degree: 11.5%) was prepared by adding metyl ethyl ketone and the nitrocellulose to a mixture of the phosphor particles and the polyester resin under stirring. To the phosphor dispersion were then added tricresyl phosphate, n-butanol and methyl ethyl ketone. The mixture was sufficiently stirred by means of a propeller agitator to obtain a homogeneous coating dispersion having a viscosity of 25–35 PS (at 25° C.).

The coating dispersion was evenly applied to the support placed horizontally on a glass plate. The coating procedure was carried out using a doctor blade. The support carrying the coating dispersion was placed in an oven and heated at a temperature gradually increasing from 25° to 100° C. Thus, a phosphor layer having a thickness of approximately 200 μm was formed on the support.

On the phosphor layer of the support was placed a transparent polyethylene terephthalate film (thickness: 12 μm; provided with a polyester adhesive layer) to laminate the transparent film thereon.

Thus, a radiographic intensifying screen consisting essentially of the support, the phosphor layer and the transparent protective film was prepared.

Further, by varying the thickness of the phosphor layer in the range of 50–350 μm, a variety of radiographic intensifying screens consisting essentially of the support, the phosphor layer having the different thickness and the transparent protective film were prepared. The so prepared intensifying screens were named Screens A.

EXAMPLE 2

As a support, a polyethylene terephthalate film (thickness: 188 μm) containing powdery titanium dioxide (rutile-type) in an amount of 0.4 mg./cm$^2$ based on the surface area of the support was prepared.

A variety of radiographic intensifying screens consisting essentially of a support, a phosphor layer having a different thickness and a transparent protective film were prepared in the same manner as mentioned in Example 1 except for using the above-mentioned support. The so prepared intensifying screens were named Screens B.

COMPARISON EXAMPLE 1

As a support, a polyethylene terephthalate film (thickness: 188 μm) not containing a white pigment was prepared. To the surface of the support was applied a coating dispersion containing powdery titanium dioxide (rutile-type), a gelatin and a hardening agent, to form a light-reflecting layer (thickness: 25 μm) containing titanium dioxide (rutile-type) in an amount of 2.7 mg./cm$^2$ based on the surface area of the support.

A variety of radiographic intensifying screens consisting essentially of a support, a phosphor layer having a different thickness and a transparent protective film were prepared in the same manner as mentioned in Example 1 except for using the support provided with the light-reflecting layer. The so prepared intensifying screens were named Screens C.

COMPARISON EXAMPLE 2

As a support, a polyethylene terephthalate film (thickness: 188 μm) containing carbon powder (light-absorbing material) was prepared.

A variety of radiographic intensifying screens consisting essentially of a support, a phosphor layer having a different thickness and a transparent protective film were prepared in the same manner as mentioned in Example 1 except for using so prepared support. The so prepared intensifying screens were named Screens D.

The radiographic intensifying screens (Screens A through Screens D) prepared in the manner as mentioned above were evaluated on the radiographic speed upon exposure to X-rays at 80 KVp.

The results on the evaluation of Screens A through Screens D are graphically set forth in FIG. 1.

In FIG. 1,

Curve A shows a relationship between a thickness of the phosphor layer and a relative radiographic speed with respect to Screens A in which the support is a polyethylene terephthalate film containing 2.2 mg./cm$^2$ of rutile-type titanium dioxide;

Curve B shows a relationship between a thickness of the phosphor layer and a relative radiographic speed with respect to Screens B in which the support is a polyethylene terephthalate film containing 0.4 mg./cm$^2$ of rutile-type titanium dioxide;

Curve C shows a relationship between a thickness of the phosphor layer and a relative radiographic speed with respect to Screens C in which the support is a polyethylene terephthalate film not containing a white pigment and a light-reflecting layer is provided thereon; and, Curve D shows a relationship between a thickness of the phosphor layer and the relative radiographic speed with respect to Screens D in which the support is a polyethylene terephthalate film containing carbon.

As is evident from the results set forth in FIG. 1, the radiographic speed of the intensifying screen is effectively improved in the case of using the support containing titanium dioxide, as compared with the case of using the support simply provided with a light-reflecting layer containing titanium dioxide, even though the amount of the titanium dioxide in the former case is less than the latter case. In other words, the radiographic intensifying screens of the present invention employing a polyethylene terephthalate film containing titanium dioxide as a support show higher radiographic speed than the conventional radiographic intensifying screens having a support provided with a light-reflecting layer containing titanium dioxide. This is because the polyethylene terephthalate film containing titanium dioxide has a higher covering power and a higher reflectivity for the light in the visible region than the light-reflecting layer containing titanium dioxide.

EXAMPLE 3

As a support, a polyethylene terephthalate film (thickness: 188 μm) containing powdery titanium dioxide (anatase-type) in an amount of 2.2 mg./cm$^2$ based on the surface area of the support was prepared.

A dispersion containing a divalent europium activated barium fluorobromide ($BaFBr:Eu^{2+}$) phosphor particles, a linear polyester resin and nitrocellulose (nitrification degree: 11.5%) was prepared by adding metyl ethyl ketone and the nitrocellulose to a mixture of the phosphor particles and the polyester resin under stirring. To the phosphor dispersion were then added tricresyl phosphate, n-butanol and methyl ethyl ketone. The resultant was sufficiently stirred by means of a propeller agitator to obtain a homogeneous coating dispersion having a viscosity of 25–35 PS (at 25° C.).

The coating dispersion was evenly applied to the support placed horizontally on a glass plate. The coating procedure was carried out using a doctor blade. The support carrying the coating dispersion was placed in an oven and heated at a temperature gradually increasing from 25° to 100° C. Thus, a phosphor layer having a thickness of approximately 200 μm was formed on the support.

On the phosphor layer of the support was placed a transparent polyethylene terephthalate film (thickness: 12 μm; provided with a polyester adhesive layer) to laminate the transparent film thereon.

Thus, a radiographic intensifying screen consisting essentially of the support, the phosphor layer and the transparent protective film was prepared. The so prepared intensifying screen was named Screen E.

EXAMPLE 4

As a support, a polyethylene terephthalate film (thickness: 188 μm) containing powdery titanium dioxide (rutile-type) in an amount of 2.2 mg./cm$^2$ based on the surface area of the support was prepared.

A radiographic intensifying screen consisting essentially of the support, the phosphor layer and the transparent protective film was prepared in the same manner as mentioned in Example 3 except for using the abovementioned support. The so prepared intensifying screen was named Screen F.

The radiographic intensifying screens (Screens E and F) prepared as described above were evaluated on the radiographic speed upon exposure to X-rays at 80 KVp.

The results are set forth in Table 1.

TABLE 1

| Screen | Relative Radiographic Speed |
|---|---|
| E | 1000 |
| F | 660 |

As is evident from the results set forth in Table 1, the radiographic speed of the radiographic intensifying screen containing a phosphor such as BaFBr:$Eu^{2+}$, which emits light in the near ultraviolet region as well as in the visible region, is sufficiently improved in the case of using the support containing anatase-type titanium dioxide having the reflectivity for the near ultraviolet rays and the visible light in the wavelength region longer than about 360 nm, as compared with the case of using a support containing rutile-type having the reflectivity for the visible light in the wavelength region longer than about 400 nm.

I claim:

1. A radiographic intensifying screen comprising a support and at least one phosphor layer provided thereonto wherein said at least one phosphor layer comprises a binder and phosphor particles dispersed therein, and wherein said support is a resin film containing a powdery white pigment in an amount ranging from 0.1 to 10.0 mg/cm$^2$, based on the surface area of the support, and said support has a thickness ranging from 100 to 500 μm.

2. The radiographic intensifying screen as claimed in claim 1, in which the content of the powdery white pigment is in the range of from 0.5 to 5.0 mg/cm$^2$ based on the surface area of the support.

3. The radiographic intensifying screen as claimed in claim 1, in which the support is a polyethylene terephthalate film containing a powdery white pigment.

4. The radiographic intensifying screen as claimed in claim 1 or claim 3, in which the powdery white pigment is titanium dioxide.

5. The radiographic intensifying screen as claimed in claim 4, in which the titanium dioxide is anatase-type titanium dioxide, and the phosphor particles emit light in both the near ultraviolet region and the visible region.

6. The radiographic intensifying screen as claimed in claim 5, in which the phosphor particles are divalent europium activated alkaline earth metal fluorohalide phosphor.

* * * * *